(12) United States Patent
Gellert et al.

(10) Patent No.: US 6,286,751 B1
(45) Date of Patent: Sep. 11, 2001

(54) METHOD OF MAKING AN INJECTION MOLDING MELT DIVIDING BUSHING

(75) Inventors: Jobst Ulrich Gellert, Georgetown; Denis L. Babin, Acton, both of (CA)

(73) Assignee: Mold-Masters Limited, Georgetown (CA)

( * ) Notice: Subject to any disclaimer, the term of this patent is extended or adjusted under 35 U.S.C. 154(b) by 0 days.

(21) Appl. No.: 09/614,008

(22) Filed: Jul. 11, 2000

Related U.S. Application Data

(62) Division of application No. 08/969,755, filed on Nov. 13, 1997, now Pat. No. 6,135,751.

(30) Foreign Application Priority Data

Oct. 23, 1997 (CA) .................................................. 2219054

(51) Int. Cl.[7] .............................. B23K 1/20; B23K 26/38
(52) U.S. Cl. ........................... 228/174; 228/144; 228/165
(58) Field of Search ..................................... 425/130, 562, 425/563, 564, 565, 566; 29/469; 228/174, 124.6, 144, 165; 264/328.4, 328.8, 328.12

(56) References Cited

U.S. PATENT DOCUMENTS

| | | |
|---|---|---|
| 3,931,449 * | 1/1976 | Hirata et al. . |
| 4,548,777 * | 10/1985 | Fukuda et al. . |
| 4,599,771 * | 7/1986 | Trenkler et al. . |
| 4,932,858 * | 6/1990 | Gellert . |
| 5,127,819 * | 7/1992 | Wright . |
| 5,540,799 * | 7/1996 | Lebby et al. . |
| 5,795,600 * | 8/1998 | Rozema . |

* cited by examiner

Primary Examiner—Tom Dunn
Assistant Examiner—Jonathan Johnson
(74) Attorney, Agent, or Firm—Foley & Lardner

(57) ABSTRACT

Multi-layer injection molding apparatus having integral multi-layer melt dividing bushings seated in the melt distribution manifold for dividing a first melt passage extending to annular melt channels in heated nozzles. Matching melt channels machined in the front face of the first layer and the rear face of the second layer of each melt dividing bushing form a melt conduit which branches from an inlet to two spaced holes extending through the second layer. A pair of matching melt channels machined in the front face of the second layer and the rear face of the third layer of each melt dividing bushing form two melt conduits, each of which branch from one of the holes through the second layer to two of four spaced holes through the third layer. The four holes through the third layer align with four melt bores leading to the annular melt channel in one of the heated nozzles. A second melt passage may extend through a central bore in each melt dividing bushing to a central melt channel in the heated nozzle. In another embodiment, the first melt passage also extends through central holes in the second and third layers of the melt dividing bushing to a central melt channel in the heated nozzle. In this case, the second melt passage may extend through a melt bore through the melt dividing bushing or may similarly divide into two in a melt conduit extending between two of the layers of the melt dividing bushing.

8 Claims, 9 Drawing Sheets

METHOD OF MAKING AN INJECTION MOLDING MELT DIVIDING BUSHING

This application is a divisional application based on U.S. patent application Ser. No. 08/969,755, filed Nov. 13, 1997, now U.S. Pat. No. 6,135,751.

BACKGROUND OF THE INVENTION

This invention relates generally to multi-layer injection molding apparatus and more particularly to such apparatus having integral multi-layer melt dividing bushings seated in the melt distribution manifold for dividing the melt flowing to annular melt channels in the heated nozzles.

Injection molding apparatus for making multi-layered protective containers for food or preforms or parisons for beverage bottles are well known. Often the inner and outer layers are made of a polyethylene terephthalate (PET) type material with one or more barrier layers made of a material such as ethylene vinyl alcohol copolymer (EVOH) or nylon. In some multi-cavity apparatus the two different melts are distributed through a single melt distribution manifold having different passages, but preferably for materials such as these having different injection temperatures of about 565° F. and 400° F. respectively, the two melts are distributed through two different melt distribution manifolds. In some cases, the melts are injected sequentially, while in other cases both coinjection and sequential injection are utilized. The two materials are injected through a heated nozzle having a central melt channel and one or more annular melt channels extending around the central melt channel to a gate leading to the cavity.

It is also known to divide the melt flowing to the annular melt channel to provide more uniform distribution around the annular melt channel. As seen in the applicant's U.S. Pat. No. 5,094,603 which issued Mar. 10, 1992, this has been done by providing a single layer melt distribution plate mounted between the rear end of the heated nozzles and the front face of the melt distribution manifold. While this is suitable for many situations, it has the disadvantage of requiring extensive machining of the front face of the melt distribution manifold and the rear ends of the heated nozzles. Also, it is not suitable for receiving melt from two separate manifolds and has the disadvantage of increasing the height of the mold.

SUMMARY OF THE INVENTION

Accordingly, it is an object of the present invention to at least partially overcome the disadvantages of the prior art by providing multi-layer injection molding apparatus having the melt flowing to an annular channel in the heated nozzles divided in integral multi-layer melt dividing bushings seated in the melt distribution manifold.

To this end, in one of its aspects, the invention provides a melt dividing bushing having a side surface extending from a rear end to a front end. The melt dividing bushing is used in a multi-cavity hot runner injection molding apparatus having a plurality of heated nozzles mounted in a mold, for dividing a melt passage extending therethrough from a single inlet to four outlets at its front end. The melt dividing bushing comprises at least first, second and third layers integrally joined together. The first layer has a rear face and a front face. The third layer has a rear face, a front face and four spaced holes extending therethrough. The second layer has a rear face, a front face and two spaced holes extending therethrough. The rear face of the second layer abuts against the front face of the first layer and the front face of the second layer abuts against the rear face of the third layer. The front face of the first layer and the rear face of the second layer have matching grooves which form a first melt conduit which branches from the single inlet to the two spaced holes extending through the second layer. The front face of the second layer and the rear face of the third layer having matching grooves which form two second melt conduits. Each of the second melt conduits branches from one of the two spaced holes through the second layer to two of the four spaced holes extending through the third layer. Thus, the melt passage extends from the single inlet through the first melt conduit, the two spaced holes through the second layer, the two second melt conduits and the four spaced holes through the third layer.

In another of its aspects, the invention provides multi-cavity hot runner injection molding apparatus for multi-layer molding having at least one melt distribution manifold with a front face and a plurality of heated nozzles mounted in a mold. Each heated nozzle has a rear end, a front end, a central melt channel extending therethrough from the rear end to the front end, an annular melt channel extending around the central melt channel to the front end and four spaced melt bores extending from the rear end to the annular melt channel. A first melt passage from a first melt source branches in the melt distribution manifold and extends through the four spaced melt bores and the annular melt channel in each heated nozzle to a gate adjacent the front end of the heated nozzle leading to a cavity in the mold. A second melt passage from a second melt source branches in the at least one melt distribution manifold and extends through the central melt channel in each heated nozzle to the gate. There are a number of integral three layer melt dividing bushings each having a rear end, a front end, and a central bore extending therethrough from the rear end to the front end. Each melt dividing bushing is seated in the front face of the melt distribution manifold with its front end abutting against the rear end of one of the heated nozzles. The second melt passage from the second melt source extends through the central bore in each melt dividing bushing to the central melt channel extending through each heated nozzle. Each melt dividing bushing has a first layer at its rear end, a third layer at its front end, and a second layer between the first and third layers. The first, second and third layers are integrally joined together to form the melt dividing bushing. The first layer has a rear face and a front face. The rear face abuts against the melt distribution manifold. The third layer having a rear face, a front face, and four holes spaced around the central bore extending therethrough from the rear face to the front face. The front face of the third layer abuts against the rear end of the heated nozzle with the central melt bore through the melt dividing bushing aligned with the central melt channel in the heated nozzle and the four spaced holes through the third layer aligned with the four spaced melt bores at the rear end of the heated nozzle. The second layer has a rear face, a front face, and two holes spaced around the central melt bore extending therethrough from the rear face to the front face. The rear face of the second layer abuts against the front face of the first layer. The front face of the second layer abuts against the rear face of the third layer. The front face of the first layer and the rear face of the second layer have matching grooves therein which form a melt conduit which branch from an inlet aligned with the first melt passage in the melt distribution manifold to the two spaced holes extending through the second layer. The front face of the second layer and the rear face of the third layer having matching grooves therein which from two melt conduits. Each of the melt conduits branches from one of the two holes through the second layer to two of the four spaced holes extending through the third layer. The first melt passage from the first melt source extends through the two spaced holes through the second layer and the four spaced holes through the third layer of each melt dividing bushing and the four spaced melt bores and the annular melt channel through each heated nozzle.

In another of its aspects, the invention provides multi-cavity hot runner injection molding apparatus for multi-layer molding having one or more melt distribution manifolds with a front face and a plurality of heated nozzles mounted in a mold. Each heated nozzle has a rear end, a front end, a central melt channel extending therethrough from the rear end to the front end, an inner annular melt channel extending around the central melt channel to the front end with at least one melt bore extending from the rear end of the heated nozzle to the inner annular melt channel. A first melt passage from a first melt source branches in the melt distribution manifold and extends through the central melt channel in each heated nozzle to a gate adjacent the front end of the heated nozzle leading to a cavity in the mold. A second melt passage from a second melt source branches in the melt distribution manifold and extends through the melt bore and the inner annular melt channel in each heated nozzle to the gate.

In this alternative embodiment, each heated nozzle has an outer annular melt channel extending to the front end around the central melt channel and the inner annular melt channel. Four spaced melt bores extend from the rear end to the outer annular melt channel. A number of integral three layer melt dividing bushings each having a rear end and a front end are seated in the front face of the melt distribution manifold. The front end of the melt dividing bushing abuts against the rear end of one of the heated nozzles and the second melt passage from the second melt source extends through the at least one melt bore to the inner annular melt channel in each heated nozzle.

Each melt dividing bushing has a first layer at its rear end, a third layer at its front end, and a second layer between the first and third layers. The first, second and third layers are integrally joined together to form the melt dividing bushing. The first layer has a rear face and a front face, with the rear face abutting against the at least one melt distribution manifold. The third layer has a rear face, a front face, a central hole and four holes spaced around the central hole extending therethrough from its rear face to its front face. The front face of the third layer abuts against the rear end of the heated nozzle. The central hole through the third layer is aligned with the central melt channel in the heated nozzle and the four spaced holes through the third layer aligned with the four spaced melt bores at the rear end of the heated nozzle. The second layer has a rear face, a front face, a central hole extending therethrough from the rear face to the front face in alignment with the central hole through the third layer, and two holes spaced around the central hole extending therethrough from the rear face to the front face. The rear face of the second layer abuts against the front face of the first layer and the front face of the second layer abuts against the rear face of the third layer. The front face of the first layer and the rear face of the second layer have matching grooves which form a melt conduit which branches from an inlet aligned with the first melt passage in the melt distribution manifold to the central hole and the two spaced holes extending through the second layer. The front face of the second layer and the rear face of the third layer have matching grooves which form two melt conduits. Each of the melt conduits branching from one of the two holes through the second plate to two of the four spaced holes extending through the third layer.

The first melt passage from the first melt source extends through the central hole through the second layer and through the aligned central hole in the third layer and the aligned central melt channel extending through each heated nozzle and through the two spaced holes through the second layer and the four spaced holes through the third layer of each melt dividing bushing and the four spaced melt bores and the outer annular melt channel through each heated nozzle.

In a further of its aspects, the invention provides a melt dividing bushing having a side surface extending from a rear end to a front end. The melt dividing bushing is used in a multi-cavity hot runner injection molding apparatus having a plurality of heated nozzles mounted in a mold for dividing a melt passage extending therethrough from a common inlet on its side surface to a plurality of outlets at its front end. The melt dividing bushing comprising a rear layer and a front layer integrally joined together. The rear layer has a rear face, a front face and an outer surface extending from the rear face to the front face. A pair of first melt conduits extends inwardly from the common inlet on its side surface to two inner ends spaced apart. Two spaced holes extend forwardly from the inner end of the melt conduits to the front face of the rear layer. The front layer has a rear face, a front face and four spaced holes extending therethrough. The rear face of the front layer abuts against the front face of the rear layer. The front face of the rear layer and the rear face of the front layer having matching grooves which form a pair of second melt conduits. Each of the second melt conduits branches from one of the two spaced holes from the rear layer to two of the four spaced holes extending through the front layer. Thus, the melt passage extends from the common inlet through the first melt conduits, the two spaced holes through the rear layer, the two second melt conduits and the four spaced holes through the front layer.

In another of its aspects, the invention further provides a method of making a melt dividing bushing having a side surface extending from a rear end to a front end. The melt dividing bushing is used in a multi-cavity hot runner injection molding apparatus having a plurality of heated nozzles in a mold for dividing a melt passage extending therethrough from a single inlet on its side surface to four outlets at its front end. The method comprises the steps of making first, second and third layers, each layer having a rear and a front face. Two spaced holes are drilled through the second layer from the rear face to the front face. Four spaced holes are drilled through the third layer from the rear face to the front face. Matching grooves are machined in the front face of the first layer and the rear face of the second layer to form a first melt conduit branching from the single inlet to the two spaced holes extending through the second layer. Matching grooves are machined in the front face of the second layer and the rear face of the third layer to form two second melt conduits. Each of the second melt conduits branches from one of the two spaced holes through the second layer to two of the four spaced holes through the third layer. Brazing material is then applied to one of the front surface of the first layer and the rear surface of the second layer and to one of the front surface of the second layer and the rear surface of the third layer. The first, second and third layers are assembled with the front surface of the first layer abutting against the rear surface of the second layer and the front surface of the second layer abutting against the rear surface of the third layer. The assembled layers are heated in a vacuum furnace to a predetermined temperature under a partial vacuum according to a predetermined cycle whereby the brazing material flows between the first, second and third layers and integrally brazes them together to form the melt dividing bushing. The melt passage extends from the single inlet on the side surface through the first melt conduit, the two spaced holes through the second layer, the two second melt conduits and the four spaced holes through the third layer to the four outlets at the front end of the melt dividing bushing.

Further objects and advantages of the invention will appear from the following description taken together with the accompanying drawings.

DETAILED DESCRIPTION OF THE INVENTION

Figure 1:
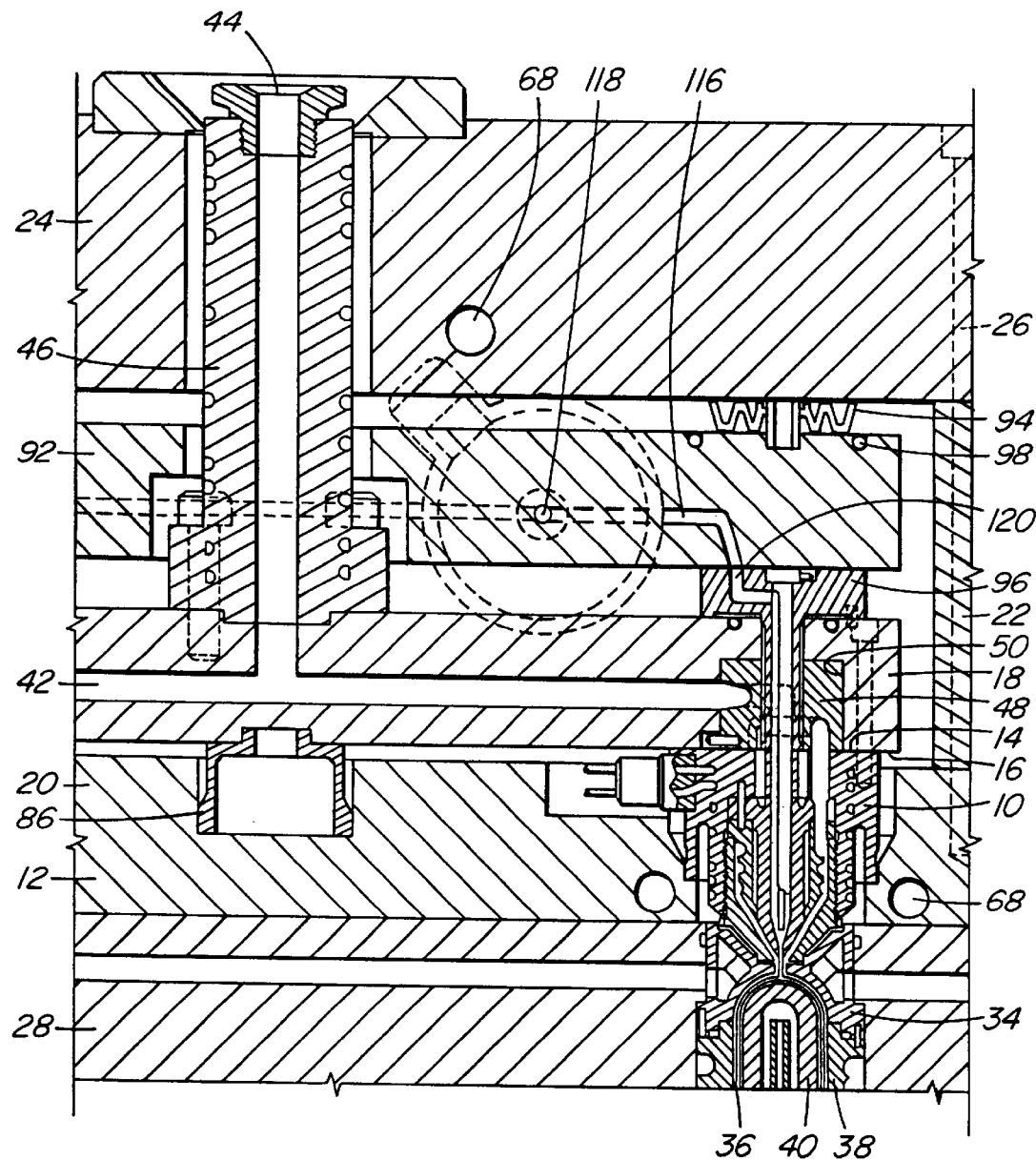
FIG. 1 is a partial sectional view of a portion of multi-layer injection molding apparatus having integral three layer melt dividing bushings according to one embodiment of the invention.
Figure 2:
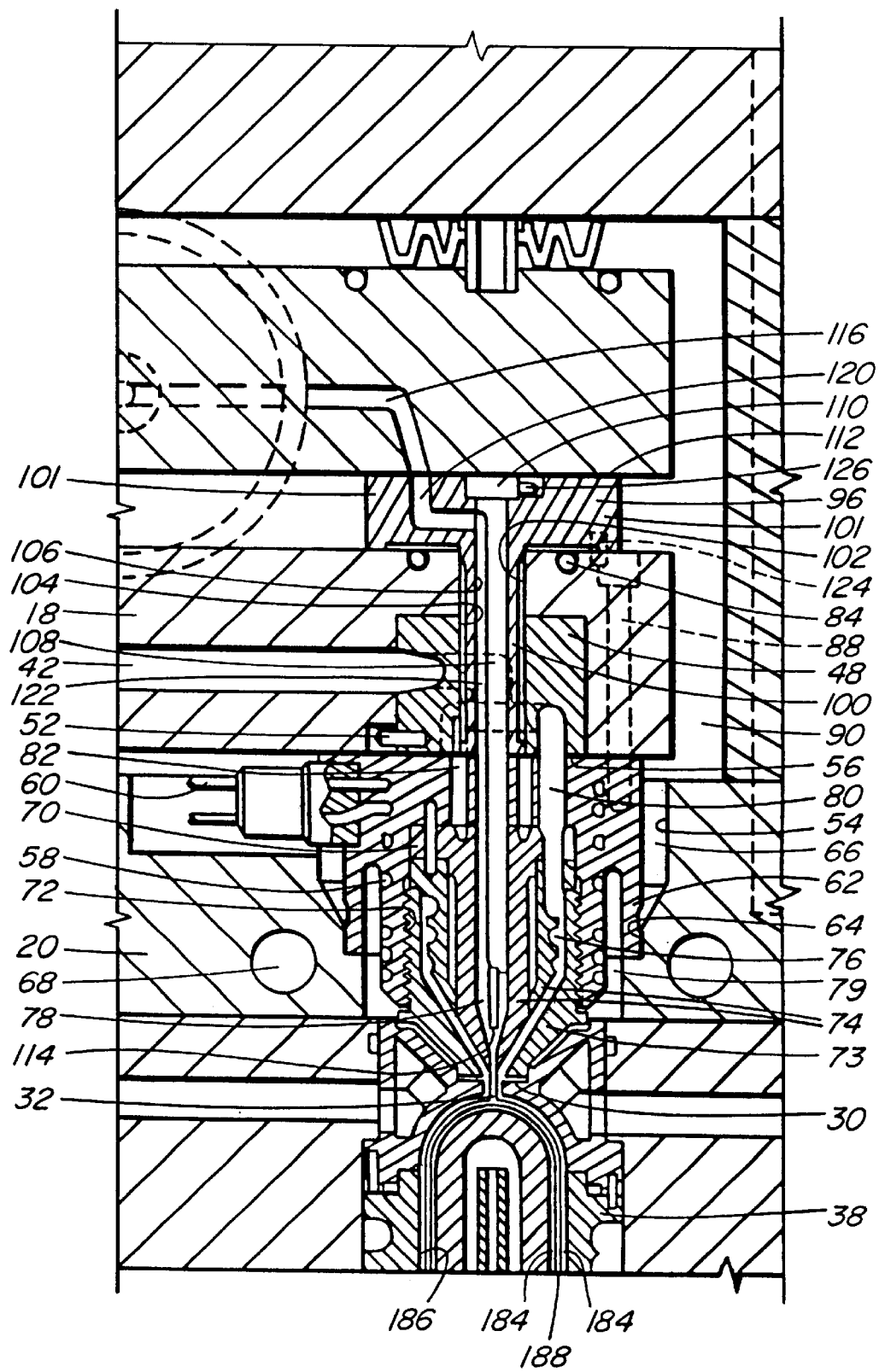
FIG. 2 is an enlarged section of a portion of FIG. 1.

Reference is first made to FIGS. 1 and 2 which shows a portion of multi-cavity injection molding apparatus for molding three layer preforms or other products by coinjection molding. A number of heated nozzles 10 are mounted in a mold 12 with their rear ends 14 abutting against the front face 16 of a steel front melt distribution manifold 18. While the mold 12 can have a greater number of plates depending upon the application, in this case only a nozzle retainer plate 20, a spacer plate 22 and a back plate 24 secured together by bolts 26, as well as a cavity retainer plate 28 are shown for ease of illustration. The front tip end 30 of each heated nozzle 10 is aligned with a gate 32 extending through a cooled gate insert 34 to a cavity 36. This cavity 36 for making beverage bottle preforms extends between a cavity insert 38 and a mold core 40 in a conventional manner. One melt passage 42 extends from an inlet 44 through a cylindrical manifold extension 46 and branches in the front melt distribution manifold 18 to extend through a melt dividing bushing 48 received in a seat 50 in the front face 16 of the front manifold 18 according to the invention to each heated nozzle 10. The melt dividing bushings 48 are retained in proper alignment by small alignment dowels 52 extending into the front melt distribution manifold 18. While only a single heated nozzle 10 is shown for ease of illustration, it is understood that in a typical configuration there will be many heated nozzles 10 (eg. 32, 48or 64) seated in the mold to receive melt through the melt passage 42 which will have a more complex configuration than that shown.

Each heated nozzle 10 is seated in an opening 54 in the nozzle retainer plate 20 with its rear end 14 abutting against the front end 56 of the melt dividing bushing 48. The heated nozzle 10 is heated by an integral electrical heating element 58 having a terminal 60. A rear collar portion 62 of each heated nozzle 10 is received in a circular locating seat 64 extending around the opening 54. This provides an insulative air space 66 between the heated nozzle 10 and the surrounding mold 12 which is cooled by pumping cooling water through cooling conduits 68. In the configuration shown, each heated nozzle 10 has an insert portion 70 which is secured in a seat 72 by a threaded nozzle seal 73 which is screwed into place and forms the front tip end 30 of the heated nozzle 10. The nozzle seal 70 is made of several steel pieces 74 which fit together to provide an annular melt channel 76 extending around a central melt channel 78 to the front tip end 30. The insert portion 70 of the heated nozzle 10 also has an annular insulative air space 79 which extends between the central melt channel 78 and the surrounding annular melt channel 76 to provide some thermal separation between them. The central melt channel 78 extends from the rear end 14 of the heated nozzle 10, while the surrounding annular melt channel 76 extends from four spaced melt bores 80 running to the rear end 14 of the heated nozzle 10. A circle of spaced holes 82 are drilled in the rear end 14 of the heated nozzle 10 to extend between the central melt channel 78 and the surrounding spaced melt bores 80 to provide some thermal separation between them.

The front melt distribution manifold 18 is heated by an integral electrical heating element 84. It is located by a central locating ring 86 and screws 88 extending into each heated nozzle 10 to have an insulative air space 90 extending between it and the surrounding cooled mold 12. In this embodiment of the invention, another steel rear melt distribution manifold 92 is mounted in the mold 12 by a number of insulative and resilient spacers 94 extending between it and the back plate 24 to extend parallel to the front melt distribution manifold 18. As can be seen, the two manifolds 18, 92 are separated by thermal insulating melt transfer bushings 96 positioned between them. As described in more detail below, the rear melt distribution manifold 92 is heated by an integral electrical heating element 98 to a lower operating temperature than the front melt distribution manifold 18, and the air space 90 provided by the thermal insulating melt transfer bushings 96 between the two manifolds 18, 92 provides thermal separation between them.

In this embodiment, each thermal insulating melt transfer bushing 96 has a stem portion 100 extending forwardly from a head portion 101 through a bore 102 in the front melt distribution manifold 18 and a central bore 104 in the melt dividing bushing 48 and accurately retains the melt transfer bushing 96 in place. The melt transfer bushing 96 also has a central bore 106 which extends through the head portion 101 and the stem portion 100 and receives an elongated pin 108 which also extends through the central melt channel 78 in the heated nozzle 10. The elongated pin 108 is fixed in place with a head 110 seated in the rear face 112 of the rear melt distribution manifold 92 and a tapered front end 114 adjacent to and in alignment with the gate 32. In other embodiments, an actuated elongated valve member can be used instead of the fixed pin 108 to provide valve gating.

Another melt passage 116 extends from another inlet 118 and branches in the rear melt distribution manifold 92 to extend through a passage 120 drilled in the head portion 101 of each melt transfer bushing 96 to a longitudinal groove 122 machined in each fixed pin 108. Each melt transfer bushing 96 is mounted in proper alignment by a small dowel 124 which extends between it and the front melt distribution manifold 18. The fixed pin 108 is similarly kept in proper alignment by a small dowel 126 extending from its head 110 into the surrounding melt transfer bushing 96. The melt passage 116 then extends around the front end 114 of the fixed pin 108 to the gate 32. In another embodiment, the melt passage 116 can extend through two diagonal bores to a central bore at the front end 114 of the fixed pin 108.

Figure 3:
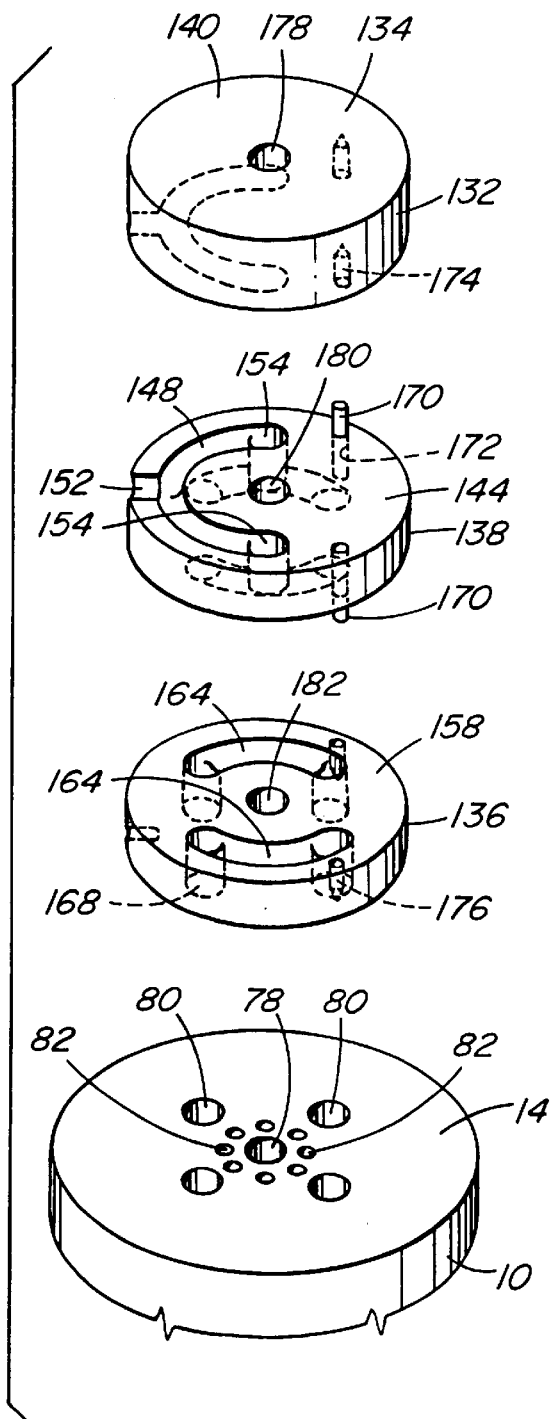
FIG. 3 is an exploded isometric view showing the three layers of the melt dividing bushing seen in FIG. 1 before they are integrally joined together.
Figure 4:
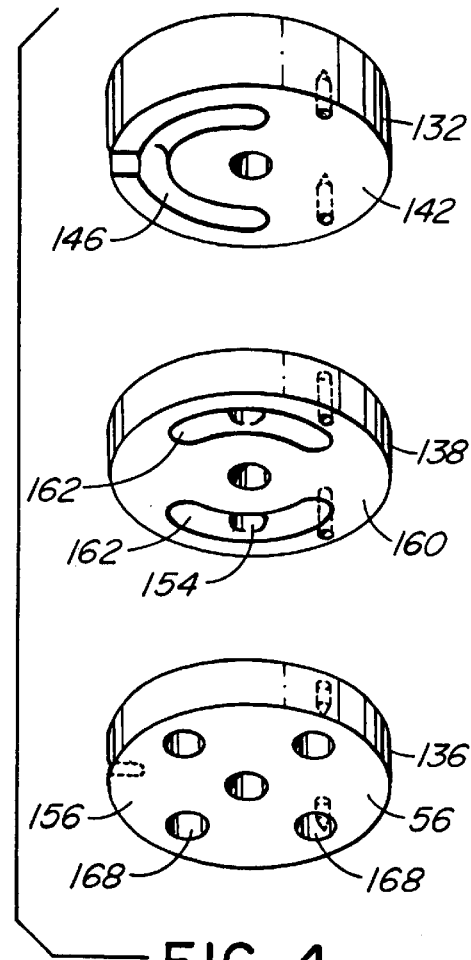
FIG. 4 is a similar view showing the other faces of the three layers of the same melt dividing bushing.
Figure 5:
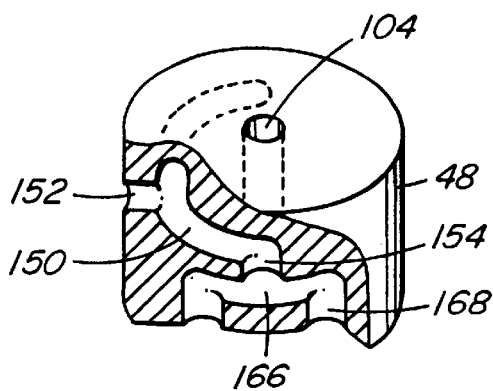
FIG. 5 is a cut-away isometric view showing the melt conduits in the same melt dividing bushing.
Figure 6:
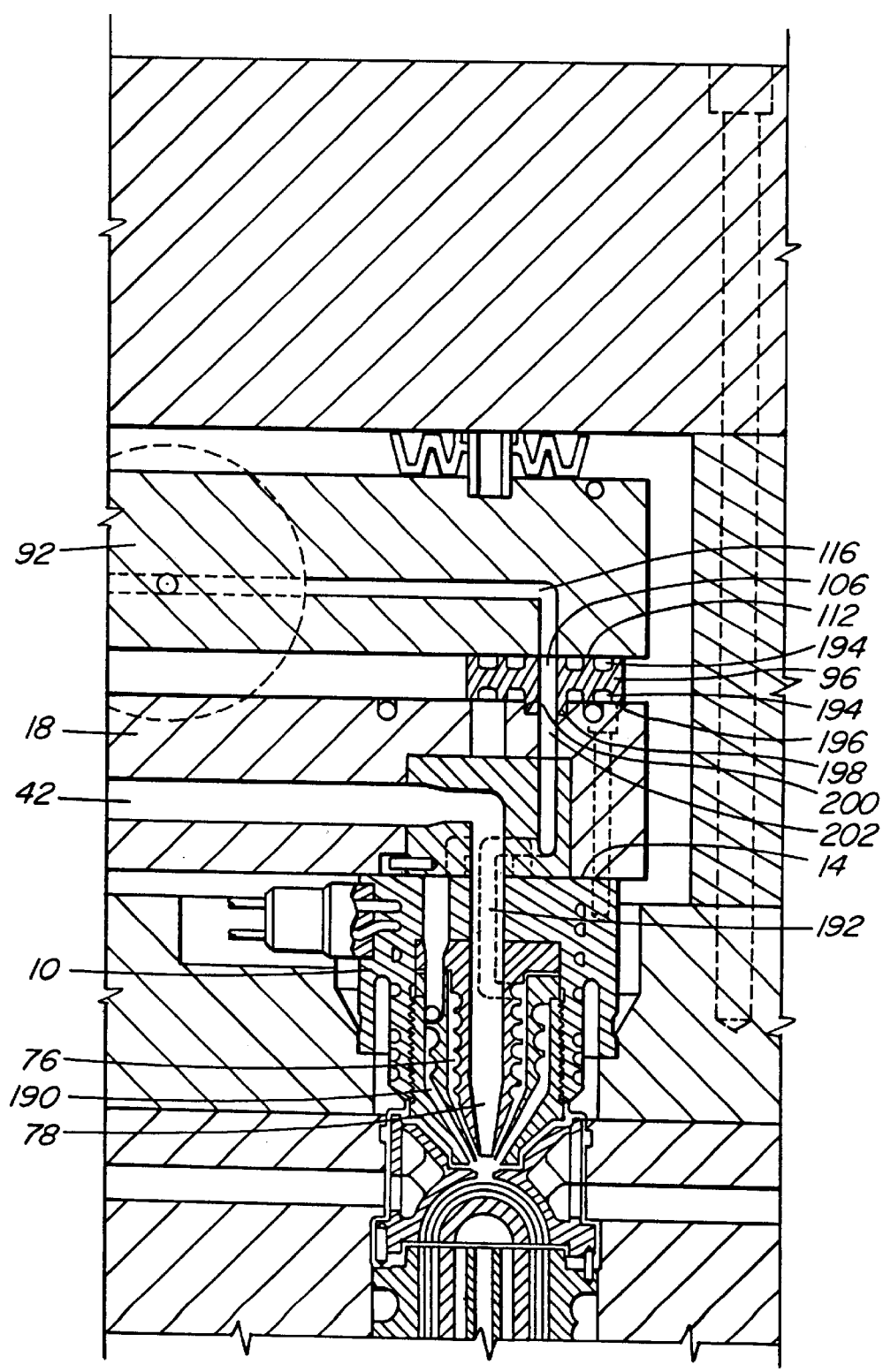
FIG. 6 is a partial sectional view of a portion of multi-layer injection molding apparatus having integral three layer melt dividing bushings according to another embodiment of the invention.

Reference is now also made to FIGS. 3–5 to describe how each steel melt dividing bushing 48 is made by integrally joining together a first layer 132 at its rear end 134, a third layer 136 at its front end 56 and a second layer 138 between the first and third layers 132, 136. The first layer 132 is made with a rear face 140 to abut against the front melt distribution manifold 18 and a front face 142 to abut against the rear face 144 of the second layer 138. The front face 142 of the first layer 132 and the rear face 144 of the second layer 138 are machined to have matching grooves 146, 148 which join when the three layers are joined together to form a melt conduit 150 which branches from an inlet 152 aligned with the melt passage 42 to two spaced holes 154 extending through the second layer 138. The third layer 136 is made with a front face 156 to abut against the rear end 14 of one of the heated nozzles 10 and a rear face 158 to abut against the front face 160 of the second layer 138. The front face 160 of the second layer 138 and the rear face 158 of the third layer 136 are machined to each have two matching curved grooves 162, 164 which join when the three layers are joined together to form two curved melt conduits 166. Each curved melt conduit 166 branches from one of the two holes 154 through the second layer 138 to two of four spaced holes 168 extending through the third layer 136, each in alignment with one of the four melt bores 80 in the rear end 14 of the heated nozzle 10.

A quantity of nickel alloy (not shown) is applied to the rear and front or front faces 144, 160 of the second layer 138 and then the three layers 132, 138, 136 are assembled together. As can be seen, two dowels 170 are mounted to extend through holes 172 through the second layer 138 into holes 174, 176 in the first and third layers 132, 136 to ensure the three layers are properly aligned. The three layers 132, 138, 136 have matching central holes 178, 180, 182 which align to form the central bore 104 through the melt dividing bushing 48. The assembled layers 132, 138, 136 are then loaded into a vacuum furnace and gradually heated to a temperature of approximately 925° F. which is above the melting temperature of the nickel alloy. As the furnace is heated, it is evacuated to a relatively high vacuum to remove substantially all of the oxygen and then partially backfilled with an inert gas such as argon or nitrogen. When the melting point of the nickel alloy is reached, the nickel alloy melts and flows by capillary action between the first layer 132 and the second layer 138 and between the second layer 138 and the third layer 136 to integrally braze the three layers 132, 138, 136 together to form an integral melt dividing bushing 48. An alternative procedure is to join the layers 132, 138, 136 together as described above and then drill the central bore 104 through the integral melt dividing bushing 48.

In use, the injection molding system is assembled as shown in FIG. 1 and operates to form three layer preforms or other products as follows. First, electrical power is applied to the heating element 84 in the front melt distribution manifold 18 and the heating elements 58 in the heated nozzles 10 to heat them to an operating temperature of about 565° F. Electrical power is also applied to the heating element 98 in the rear melt distribution manifold 92 to heat it to an operating temperature of about 400° F. Water is supplied to the cooling conduits 68 to cool the mold 12 and the gate inserts 34. Hot pressurized melt is then injected from separate injection cylinders (not shown) into the first and second melt passages 42, 116 through inlets 44, 118 according to a predetermined continuous injection cycle. The melt injected into the first melt passage 42 is a polyethylene terephthalate (PET) type material.

The first melt passage 42 extends from the front melt distribution manifold 18 into the melt conduit 150 which branches in each melt dividing bushing 48 from an inlet 152 to the two spaced holes 154 and then through the two curved melt conduits 166 to the four spaced holes 168 aligned with the four melt bores 80 in the rear end 14 of the heated nozzle 10. It then flows from these four spaced bores 80 into the annular melt channel 76 to the gate 32. The melt injected into the second melt passage 116 is a barrier material such as ethylene vinyl copolymer (EVOH) or nylon. The second melt passage 116 branches in the rear melt distribution manifold 92 and extends through the aligned passage 120 in each melt transfer bushing 96 and the aligned longitudinal groove 122 in each fixed pin 108 through the central bore 106 in the melt transfer bushing 96, the central bore 104 in the melt dividing bushing 48 and the central melt channel 78 in the heated nozzle 10 to the gate 32. During each injection cycle, a predetermined quantity of PET is injected through the first melt passage 42 and outer layers 184 of it adhere to each side 186 of the cavity 36. After a short period of time after the start of PET injection, a predetermined quantity of the less viscous barrier material is then simultaneously injected through the second melt passage 116 and forms a central layer 188 between the two outer layers 184 of PET. When the cavities 36 are almost filled, the injection pressure of the barrier material is released which stops its flow and the PET injection is continued to completely fill the cavities 36. Injection pressure of the PET is then released and, after a short cooling period, the mold 12 is opened for ejection. After ejection, the mold 12 is closed and the injection cycle is repeated continuously every 15 to 30 seconds with a frequency depending upon the wall thickness and number and size of cavities 36 and the exact materials being molded.

Reference is now made to FIGS. 6–9 showing injection molding apparatus according to another embodiment of the invention for molding three layer preforms or other products by coinjection molding. As many of the elements are the same as described above, not all the elements common to both embodiments are described and those that are described again have the same reference numerals as before. In this case, each heated nozzle 10 also has an outer annular melt channel 190 extends to the front tip end 30 around the central melt channel 78 and the inner outer annular melt channel 76. The PET in the first melt passage divides in each melt dividing bushing 48 and extends through the outer annular melt channel 190 as well as the central melt channel 78 in each heated nozzle 10 and the barrier material in the second melt passage 116 extends through the inner annular melt channel 76 which has a smaller diameter than in the previous embodiment. Two spaced melt bores 192 extend from the rear end 14 of each heated nozzle 10 to the inner annular melt channel 76.

In this embodiment, the thermal insulating melt transfer bushings 96 have a somewhat different shape with insulative air grooves 194 on both the rear face 112 and the front face 196. A circular flange 198 on the front face 196 extends around the central bore 106 and is received in a circular seat 200 in the front melt distribution manifold 18 to locate each thermal insulating melt transfer bushing 96 in place. The central bore 106 through each melt transfer bushing 96 is aligned with the melt passage 116 from the rear melt distribution manifold 92 and with a melt bore 202 extending through the front melt distribution manifold 18.

Figure 7:
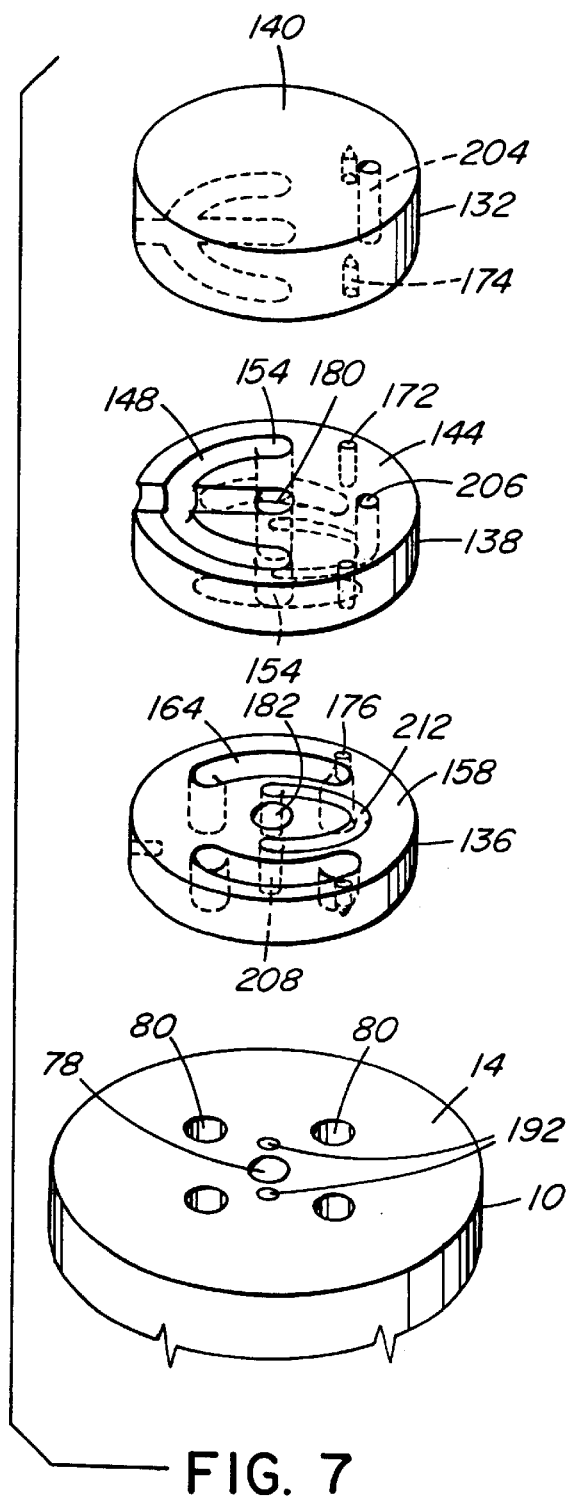
FIG. 7 is an exploded isometric view showing the three layers of the melt dividing bushing seen in FIG. 6 before they are integrally joined together.
Figure 8:
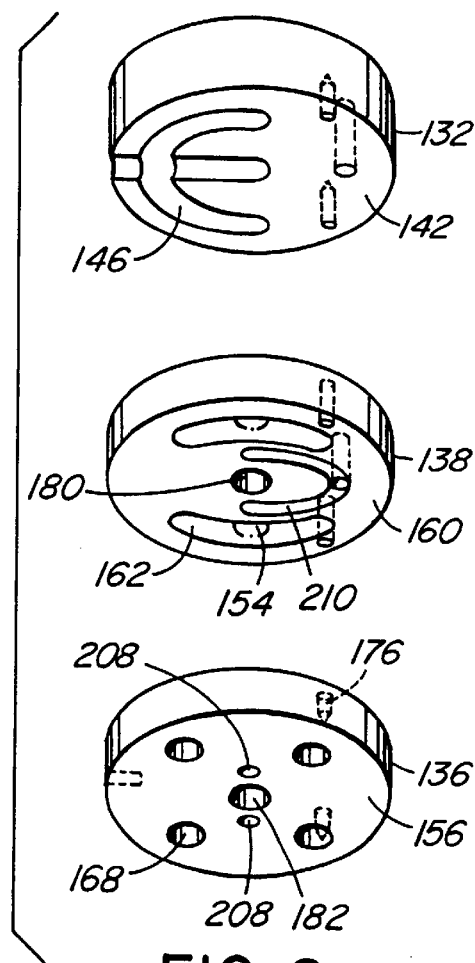
FIG. 8 is a similar view showing the other faces of the three layers of the same melt dividing bushing.
Figure 9:
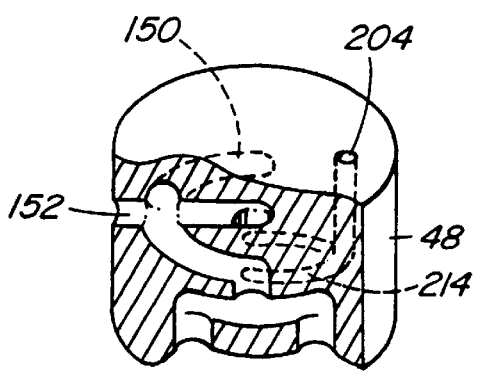
FIG. 9 is a cut-away isometric view showing the melt conduits in the same melt dividing bushing.
Figure 10:
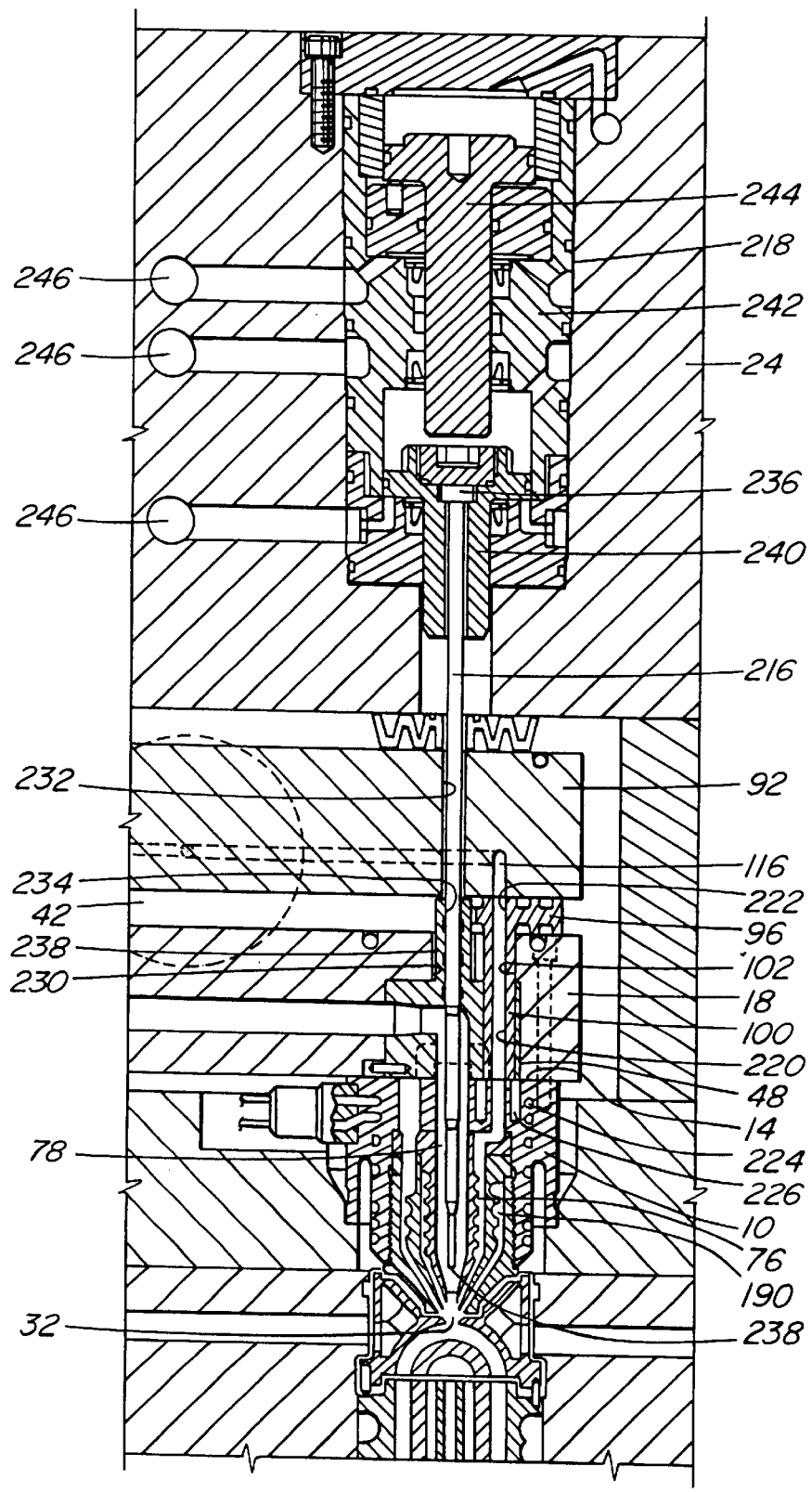
FIG. 10 is a partial sectional view of a portion of multi-layer injection molding apparatus having integral three layer melt dividing bushings according to a further embodiment of the invention.
Figure 11:
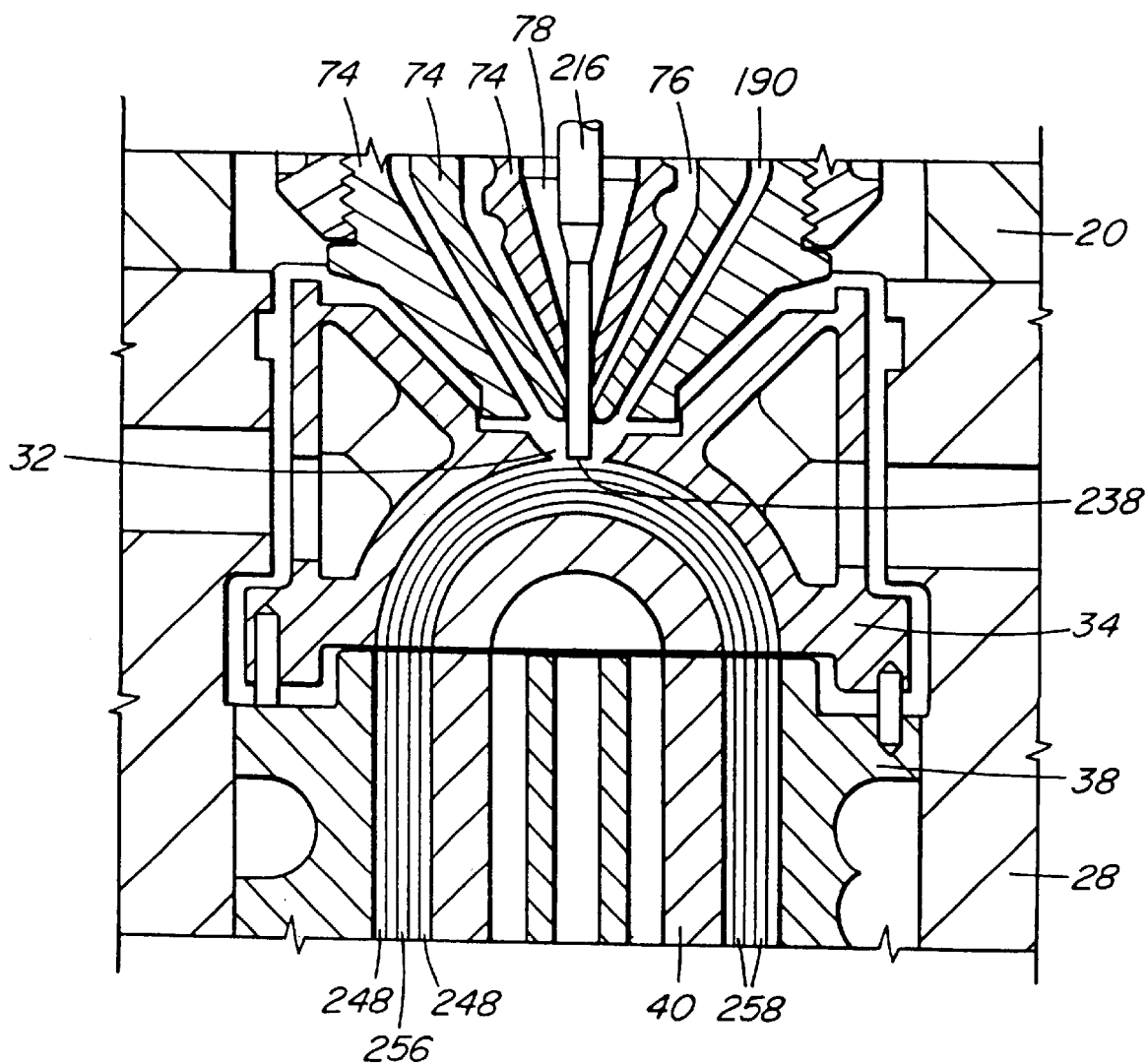
FIG. 11 is an enlarged section of FIG. 10 showing a preform having five layers in the cavity.

As seen in FIGS. 7 and 8, in this embodiment, there is no central hole through the first layer 132 of the melt dividing bushing 48 and the grooves 146, 148 in the front face 142 of the first layer 132 and the rear face 144 of the second layer 138 are machined somewhat differently so the melt conduit 150 also extends to the central holes 180, 182 through the second and third layers 136, 138. The first layer 132 of the melt dividing bushing 48 has an off center hole 204 extending therethrough from the rear face 140 to the front face 142 in alignment with a hole 206 extending through the second layer 138 from the rear face 144 to the front face 160. These holes 204, 206 are in alignment with the melt bore 202 through the front melt distribution manifold 18. The third layer 136 of the melt dividing bushing 48 has two spaced holes 208 extending therethrough from the rear face 158 to the front face 156 in alignment with the two spaced melt bores 192 in the rear end 14 of the heated nozzle 10 leading to the inner annular melt channel 76. The front face 160 of the second layer 138 and the rear face 158 of the third layer 136 have further matching grooves 210, 212 which join when the three layers are joined together to form a further melt conduit 214. The further melt conduit 214 branches from the hole 206 extending through the second layer 138 to the two spaced holes 208 extending through the third layer 136. Thus, the second melt passage 116 branches in the rear melt distribution manifold 92 and extends forwardly through the central bore 106 in each melt transfer bushing 96 and the aligned melt bore 202 in the front melt distribution manifold 18 to the holes 204, 206 in the first and second layers 132, 138 and then divides again in the further melt conduit 214 to the two spaced holes 208 in the third layer 136 leading to the two spaced melt bores 192 which in turn extend from the rear end 14 of the heated nozzle 10 to the inner annular melt channel 76. While the further melt conduit 214 is shown in this embodiment branching between the second layer 138 and the third layer 136, in other embodiments it can branch in a similar fashion between the first layer 132 and the second layer 138.

In use, during each cycle, the molding machine (not shown) first injects a small quantity of PET into the cavities 36 through the first melt passage 42 which splits in the melt dividing bushing 48 to extend through both the central melt channel 78 and the outer annular melt channel 76. Predetermined quantities of PET and the barrier material are then simultaneously coinjected through the first and second melt passages 42 and 116 to provide the central layer 188 of barrier material between the two outer PET layers 184 in the cavities 36. When the cavities 36 are almost filled, the injection pressure of the barrier material is released which stop its flow, but the flow of PET continues until the cavities 36 are completely filled. Injection pressure of the PET is then released and, after a short cooling period, the mold is opened for ejection. After ejection, the mold is closed and the cycle is repeated continuously every few seconds with a frequency depending upon the number and size of the cavities 36 and the exact materials being molded.

Reference is now made to FIGS. 10–14 showing injection molding apparatus according to a further embodiment of the invention for molding five layer preforms or other products using valve gating. As many of the elements are the same as described above, not all the elements common to all embodiments are described and those that are described again have the same reference numerals. In this case, an elongated valve member 216 is reciprocated in the central melt channel 78 in each heated nozzle 10 by hydraulic actuating mechanism 218 according to a predetermined cycle. The stem portion 100 of each thermal insulating melt transfer bushing 96 which extends forwardly through the bore 102 in the front melt distribution manifold 18 extends through an off center bore 220 in the melt dividing bushing 48. The second melt passage 116 extending from the rear melt distribution manifold 92 extends through a bore 222 in the thermal insulating melt transfer bushing 96 into an aligned bore 224 extending from the rear end 14 of the heated nozzle 10 to the outer annular melt channel 190. The bore 224 in the heated nozzle 10 is surrounded by a circle of spaced holes 226 to provide thermal separation for the melt flowing through the melt passage 116.

Figure 12:
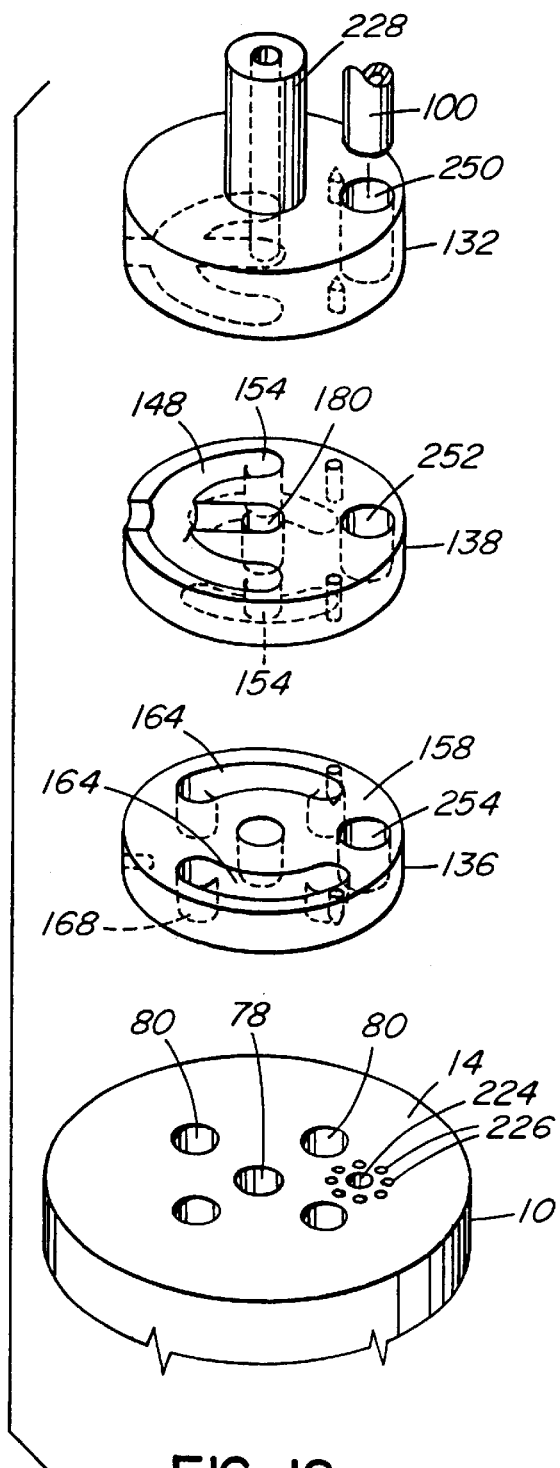
FIG. 12 is an exploded isometric view showing the three layers of the melt dividing bushing seen in FIG. 10 before they are integrally joined together.
Figure 13:
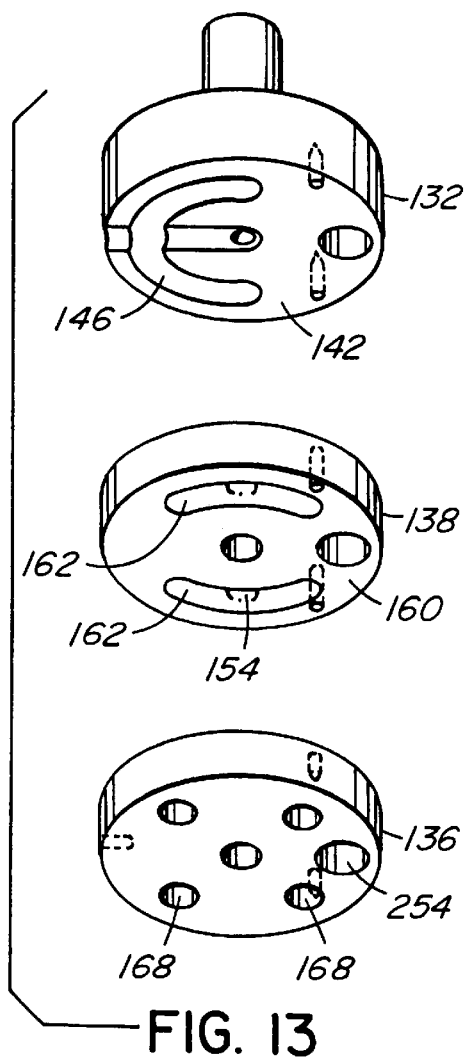
FIG. 13 is a similar view showing the other faces of the three layers of the same melt dividing bushing.
Figure 14:
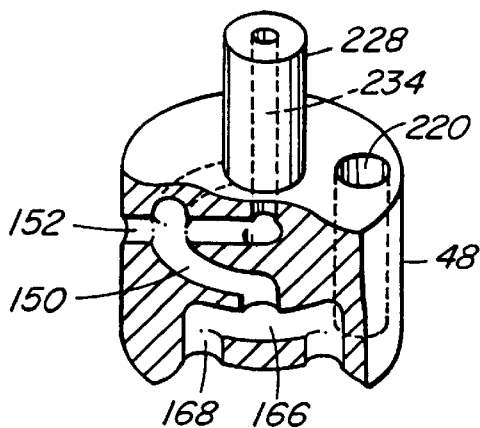
FIG. 14 is a cut-away isometric view showing the melt conduits in the same melt dividing bushing.

As also seen in FIGS. 12–14, matching grooves 146, 148 in the front face 142 of the first layer 132 and the rear face 144 of the second layer 138 of each melt dividing bushing 48 are again machined so the melt conduit 150 formed when they are joined together connect the two spaced holes 154 and the central hole 180 through the second layer 136 to the inlet 152. Similarly, matching grooves 162, 164 in the front face 160 of the second layer 138 and the rear face 158 of the third layer 136 are machined to form a pair of curved grooves 166, each of which connects one of two holes 154 through the second layer 138 to two of four spaced holes 168 through the third layer 136. Each of the four holes 168 through the third layer 136 is in alignment with one of the four melt bores 80 in the rear end 14 of the heated nozzle 10 to conduct PET to the outer annular melt channel 190. The three layers 132, 138, 136 also have off center holes 250, 252, 254 which are big enough to receive the stem portion 100 of the melt transfer bushing 96 and are aligned to form the bore 220 in alignment with the bore 224 in the rear end 14 of the heated nozzle 10 extending to the inner annular melt channel 76. The first layer 132 of each melt dividing bushing 48 also has a neck portion 228 extending rearwardly through an opening 230 in the front melt distribution manifold 18 to the rear distribution manifold 92. The elongated valve member 216 extends through a bore 232 in the rear melt distribution manifold 92, through an aligned central bore 234 in the melt dividing bushing 48 into the aligned central melt channel 78 in the heated nozzle 10. The elongated valve member 216 has an enlarged rear end or head 236 and a front end 238 which fits in the gate 32. The rear end 236 is connected to a front piston 240 seated in a cylinder 242 in the back or cylinder plate 24. The actuating mechanism 218 also includes a rear piston 244 and the two pistons 240, 244 are driven by controlled hydraulic pressure applied through ducts 246 to reciprocate the valve member 216 between four different positions. While hydraulic actuating mechanisms 218 are shown for ease of illustration, of course other types of actuating mechanisms such as electromechanical mechanisms can be used for other applications.

In the first position, the front end 238 of each valve member 216 is retracted only far enough to allow a small quantity of PET to flow through the outer annular melt channel 190. Then the front end 238 of each valve member 216 is retracted further to a second position to also allow the barrier material to flow through the inner annular melt channel 76. The barrier material flowing simultaneously with the PET, divides the PET into two outer layers 248. After a short time, the front end 238 of each valve member 216 is retracted to the third position to allow PET to flow through the central melt channel 78 around the valve member 216. This flow of PET through the central melt channel 78 splits the flow of barrier material in two and provides a central PET layer 256 between two layers 258 of barrier material.

When the cavities 36 are almost filled, the front end 238 of each valve member 216 is returned to the first position closing off the flow of PET through the central melt channel 78 and the flow of the barrier material through the inner annular melt channel 76. The flow of PET through the outer annular melt channel 190 continues until the cavities 36 are completely filled and the valve member 216 is then driven to the forward closed position shown in FIG. 11 in which its front end 238 is seated in the gate 32. After a short cooling period, the mold is opened for ejection. After ejection, the mold is closed and the cycle is repeated continuously every 15 to 30 seconds with a frequency depending upon the wall thickness and number and size of cavities 36 and the exact materials being molded.

Figure 15:
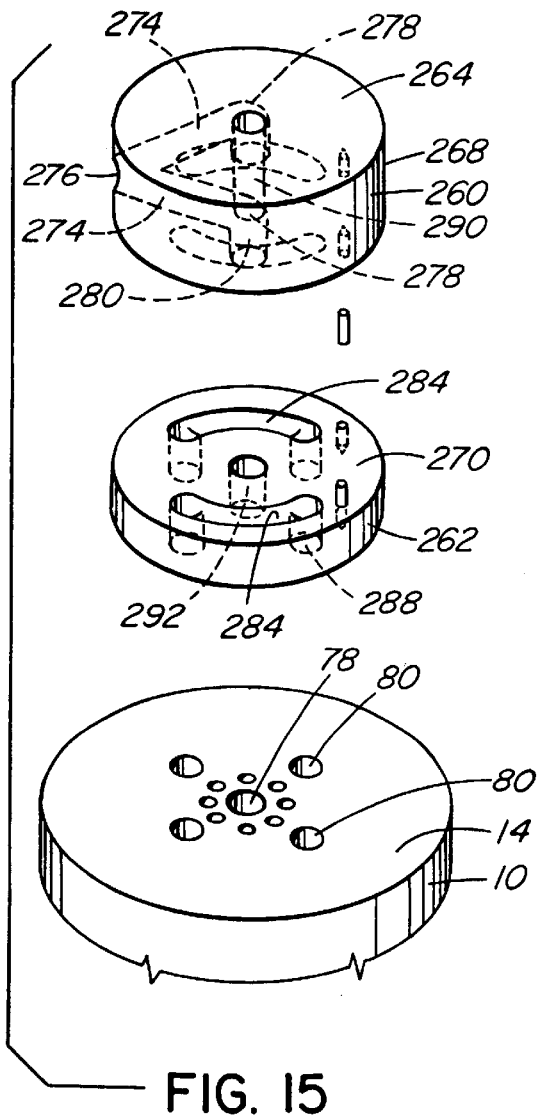
FIG. 15 is an exploded isometric view showing the two layers of a melt dividing bushing according to another embodiment of the invention.
Figure 16:
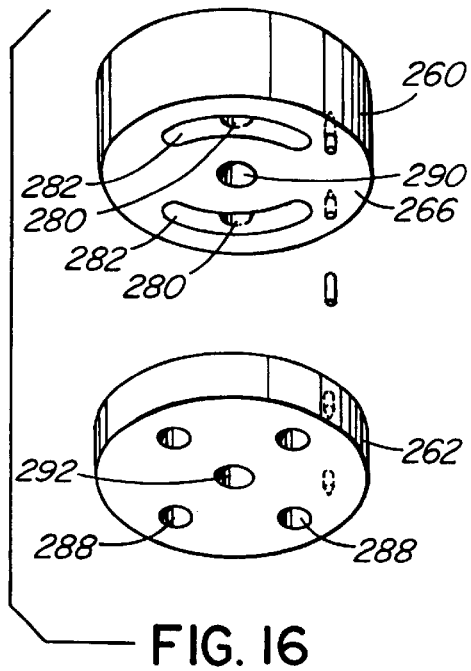
FIG. 16 is a similar view showing the other faces of the two layers of the same melt dividing bushing.
Figure 17:
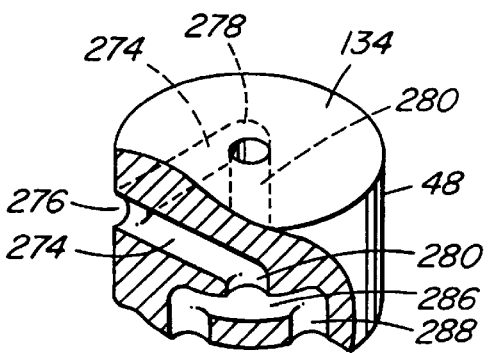
FIG. 17 is a cut-away isometric view showing the melt conduits in the same melt dividing bushing.

Reference is now made to FIGS. 15 to 17 showing a melt dividing bushing 48 suitable for use in an injection molding system such as shown in FIG. 1. In this embodiment, the melt dividing bushing 48 has a rear layer 260 and a front layer 262 which are integrally joined together rather than three layers. The rear layer 260 has a rear face 264 which forms the rear end 134 of the melt dividing bushing 48, a front face 266 and a cylindrical outer surface 268 extending from the rear face 264 to the front face 266. The front layer 262 also has a rear face 270 and a front face 272 which forms the front end of the melt dividing bushing 48.

As can be seen, the rear layer 260 has a pair of first melt conduits 274 extending inwardly from a common inlet 276 on its outer surface 268. The first melt conduits 274 extend inwardly to two inner ends 278 which are spaced apart to join two spaced holes 280 which extend from there to the front face 266 of the rear layer 260. The front face 266 of the rear layer 260 and the rear face 270 of the front layer 262 are machined to each have a pair of matching grooves 282, 284 which join when the two layers are joined together to form a pair of curved second melt conduits 286. Each of the second melt conduits 286 branches from one of the two holes 280 through the rear layer 260 to two of four spaced holes 288 extending through the front layer 262. In this embodiment, the rear and front layers 260, 262 also have matching central holes 290, 292 extending therethrough.

After the two layers 260, 262 are integrally brazed together as described above, the melt dividing bushing 48 is mounted in place with the central holes 290, 292 and the four holes 288 through the front layer 262 respectively aligned with the central melt channel 78 and the four melt bores 80 in the rear end 14 of the heated nozzle 10. The operation of this embodiment is the same as described above, and need not be repeated.

While the description of the multi-layer injection molding apparatus having integral multi-layer melt dividing bushings has been given with respect to preferred embodiments, it will be evident that various modifications are possible without departing from the scope of the invention as understood by those skilled in the art and as defined in the following claims. For instance, in another embodiment of the invention sprue gating can be used to mold five layer preforms or other products. Also, other materials having suitable characteristics can be used rather than PET, EVOH and nylon.

What is claimed is:

1. A method of making a melt dividing bushing having a rear end and a front end for use in a multi-cavity hot runner injection molding apparatus having a plurality of heated nozzles in a mold for dividing a melt passage extending therethrough from a single inlet to four outlets at the front end thereof, comprising the steps of;

(a) making first, second and third layers, each layer having a rear and a front face, (b) drilling two spaced holes through the second layer from the rear face to the front face, (c) drilling four spaced holes through the third layer from the rear face to the front face, (d) machining matching grooves in the front face of the first layer and the rear face of the second layer to form a first melt conduit branching from the single inlet to the two spaced holes extending through the second layer, (e) machining matching grooves in the front face of the second layer and the rear face of the third layer to form two second melt conduits, each of said second melt conduits branching from one of the two spaced holes through the second layer to two of the four spaced holes through the third layer, (f) applying a brazing material to at least one of the front surface of the first layer and the rear surface of the second layer and to at least one of the front surface of the second layer and the rear surface of the third layer, (g) assembling the first, second and third layers with the front surface of the first layer abutting against the rear surface of the second layer and the front surface of the second layer abutting against the rear surface of the third layer, and (h) heating the assembled first, second and third layers in a vacuum furnace to a predetermined temperature under a partial vacuum according to a predetermined cycle whereby the brazing material flows between the first, second and third layers and integrally brazes them together to form the melt dividing bushing wherein the melt passage extends from the single inlet through the first melt conduit, the two spaced holes through the second layer, the two second melt conduits and the four spaced holes through the third layer to the four outlets at the front end of the melt dividing bushing.

2. A method of making a melt dividing bushing as claimed in claim 1 including machining the matching grooves on the front face of the first layer and the rear face of the second layer to form the first melt conduit whereby the single inlet extends from a side surface of the melt dividing bushing.

3. A method of making a melt dividing bushing as claimed in claim 1 including making the first, second and third layers with a central bore extending therethrough.

4. A method of making a melt dividing bushing as claimed in claim 1 including making the second and third layer with matching central holes therethrough and machining the matching grooves in the front face of the first layer and the rear face of the second layer to form the first melt conduit to also extend to the central holes through the second and third layers and whereby the single inlet extends from a side surface of the melt dividing bushing.

5. A method of making a melt dividing bushing as claimed in claim 4 including making the first, second and third layers with aligned matching holes offset from the central holes extending therethrough.

6. A method of making a melt dividing bushing as claimed in claim 4 including making the third layer with two other holes spaced around the central hole therethrough, making the first layer with a hole extending therethrough, making the second layer with another hole extending therethrough in alignment with the hole through the first layer, machining further matching grooves in the front face of the second layer and the rear face of the third layer to form a further melt conduit which branches from the hole through the second layer to the two spaced holes through the third layer.

7. A method of making a melt dividing bushing as claimed in claim 4 including making the second and third layers each with two aligned holes spaced around the central hole, making the first layer with a hole extending therethrough, machining further matching grooves in the front face of the first layer and the rear face of the second layer to form a further melt conduit which branches from the hole through the first layer to the two spaced holes through the second and third layers.

8. A method of making a melt dividing bushing for use in a multi-cavity hot runner injection molding apparatus having a plurality of heated nozzles in a mold for dividing a melt passage extending therethrough from a single inlet to four outlets at a front end thereof, comprising the steps of;

(a) making a rear layer having a front face, a rear face and a side surface, (b) making a front layer having a front face, a rear face and four spaced holes extending therethrough, (c) drilling two diagonal holes in the rear layer extending from a single inlet on the side surface inwardly to two inner ends spaced a predetermined distance apart, (d) drilling two spaced holes in the rear layer, each extending forwardly from the inner end of one of the diagonal holes to the front face of the rear layer, (e) machining matching grooves in the front face of the rear layer and the rear face of the front layer to form two melt conduits, each of said melt conduits branching from one of the two spaced holes in the rear layer to two of the four spaced holes through the front layer, (f) applying a brazing material to at least one of the front surface of the rear layer and the rear surface of the front layer, (g) assembling the rear and front layers with the front surface of the rear layer abutting against the rear surface of the front layer, and (h) heating the assembled front and rear layers in a vacuum furnace to a predetermined temperature under a partial vacuum according to a predetermined cycle whereby the brazing material flows between the front and rear layers and integrally brazes them together to form the melt dividing bushing wherein the melt passage extends from the single inlet on the side surface through the diagonal holes in the rear layer, the two spaced holes in the rear layer, the two melt conduits, and the four spaced holes through the front layer to the four outlets at the front end of the melt dividing bushing.

* * * * *